(12) United States Patent
Donsbach et al.

(10) Patent No.: US 8,122,020 B1
(45) Date of Patent: *Feb. 21, 2012

(54) RECOMMENDATIONS BASED ON ITEM TAGGING ACTIVITIES OF USERS

(75) Inventors: Aaron Donsbach, Seattle, WA (US); Andrej Gregov, Seattle, WA (US); Jeffrey D. Few, Seattle, WA (US); Jeffrey D. Lehman, Lynnwood, WA (US); Jeffrey T. Brownell, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/693,210

(22) Filed: Jan. 25, 2010

Related U.S. Application Data

(63) Continuation of application No. 11/281,886, filed on Nov. 17, 2005, now Pat. No. 7,668,821.

(51) Int. Cl.
*G06F 7/00* (2006.01)
*G06F 17/30* (2006.01)
*G06Q 30/00* (2012.01)

(52) U.S. Cl. ....... 707/732; 707/765; 707/948; 705/26.7; 705/27.1

(58) Field of Classification Search .................. 707/738, 707/765–767, 948, 732–734; 705/26.7, 27.1
See application file for complete search history.

(56) References Cited

U.S. PATENT DOCUMENTS

| | | | |
|---|---|---|---|
| 5,749,081 A | 5/1998 | Whiteis | |
| 5,815,665 A | 9/1998 | Teper et al. | |
| 6,014,664 A | 1/2000 | Fagin et al. | |
| 6,029,141 A | 2/2000 | Bezos et al. | |
| 6,134,532 A | 10/2000 | Lazarus et al. | |
| 6,182,050 B1 | 1/2001 | Ballard | |
| 6,282,548 B1 | 8/2001 | Burner et al. | |
| 6,317,722 B1 | 11/2001 | Jacobi et al. | |

(Continued)

FOREIGN PATENT DOCUMENTS

WO    WO 01/15002 A2    3/2001

(Continued)

OTHER PUBLICATIONS

Sturtz. Communal Categorization: The Folksonomy. INFO622: Content Representation [online], Dec. 16, 2004 [retrieved on Sep. 20, 2010]. Retrieved from the Internet:<URL: http://citeseerx.ist.psu.edu/viewdoc/download?doi=10.1.1.89.5966&rep=rep1&type=pdf>.*

(Continued)

*Primary Examiner* — John R. Cottingham
*Assistant Examiner* — James E Richardson
(74) *Attorney, Agent, or Firm* — Knobbe Martens Olson & Bear LLP

(57) ABSTRACT

A system provides a user interface through which users can flexibly tag individual items represented in an electronic catalog with user-defined tags, such as text strings, and obtain recommendations that are specific to particular tags. The tags and tag-item assignments created by each user are stored persistently in association with the user, and may be kept private to the user or exposed to others. Once a user has assigned a tag to a number of items, the user (or another user in some embodiments) can request and obtain recommendations that are specific to this tag. These recommendations may be generated in real time by a recommendation service that identifies items that are collectively similar or related to the items associated with the tag.

17 Claims, 6 Drawing Sheets

U.S. PATENT DOCUMENTS

| | | | |
|---|---|---|---|
| 6,438,579 B1 | 8/2002 | Hosken | |
| 6,442,542 B1 | 8/2002 | Ramani et al. | |
| 6,460,036 B1 | 10/2002 | Herz | |
| 6,493,702 B1 | 12/2002 | Adar et al. | |
| 6,535,888 B1 | 3/2003 | Vijayan et al. | |
| 6,598,026 B1 | 7/2003 | Ojha et al. | |
| 6,601,075 B1 | 7/2003 | Huang et al. | |
| 6,611,814 B1 | 8/2003 | Lee et al. | |
| 6,618,727 B1 | 9/2003 | Wheeler et al. | |
| 6,691,163 B1 | 2/2004 | Tufts | |
| 6,704,727 B1 | 3/2004 | Kravets | |
| 6,853,982 B2 | 2/2005 | Smith et al. | |
| 6,865,573 B1 | 3/2005 | Hornick et al. | |
| 6,873,985 B2 | 3/2005 | Newman | |
| 6,889,250 B2 | 5/2005 | Bezos et al. | |
| 6,912,505 B2 | 6/2005 | Linden et al. | |
| 6,981,040 B1 | 12/2005 | Konig et al. | |
| 7,003,515 B1 | 2/2006 | Glaser et al. | |
| 7,007,006 B2 | 2/2006 | Zilio et al. | |
| 7,092,941 B1 | 8/2006 | Campos | |
| 7,114,170 B2 | 9/2006 | Harris et al. | |
| 7,152,061 B2 | 12/2006 | Curtis et al. | |
| 7,310,612 B2 | 12/2007 | McQueen, III et al. | |
| 7,548,914 B2 | 6/2009 | Bell et al. | |
| 7,590,562 B2 | 9/2009 | Stoppelman | |
| 7,594,189 B1 | 9/2009 | Walker et al. | |
| 7,668,821 B1 | 2/2010 | Donsbach | |
| 7,685,209 B1* | 3/2010 | Norton et al. | 707/803 |
| 7,720,720 B1 | 5/2010 | Sharma et al. | |
| 7,765,130 B2 | 7/2010 | McQueen, III et al. | |
| 2001/0014868 A1 | 8/2001 | Herz et al. | |
| 2002/0010625 A1* | 1/2002 | Smith et al. | 705/14 |
| 2002/0087515 A1 | 7/2002 | Swannack et al. | |
| 2002/0116310 A1 | 8/2002 | Cohen et al. | |
| 2002/0128959 A1 | 9/2002 | Kostic et al. | |
| 2002/0138354 A1 | 9/2002 | Seal et al. | |
| 2002/0184139 A1 | 12/2002 | Chickering et al. | |
| 2002/0198882 A1 | 12/2002 | Linden et al. | |
| 2003/0105682 A1 | 6/2003 | Dicker et al. | |
| 2003/0126235 A1 | 7/2003 | Chandrasekar et al. | |
| 2003/0126606 A1 | 7/2003 | Buczak et al. | |
| 2003/0172357 A1 | 9/2003 | Kao et al. | |
| 2003/0233422 A1 | 12/2003 | Csaszar et al. | |
| 2004/0034652 A1 | 2/2004 | Hofmann et al. | |
| 2004/0093321 A1 | 5/2004 | Roustant et al. | |
| 2004/0103186 A1 | 5/2004 | Casati et al. | |
| 2005/0004880 A1 | 1/2005 | Musgroove et al. | |
| 2005/0033657 A1 | 2/2005 | Herrington et al. | |
| 2005/0038717 A1 | 2/2005 | McQueen, III et al. | |
| 2005/0038819 A1 | 2/2005 | Hicken et al. | |
| 2005/0071251 A1 | 3/2005 | Linden et al. | |
| 2005/0091245 A1 | 4/2005 | Chickering et al. | |
| 2005/0171861 A1 | 8/2005 | Bezos et al. | |
| 2005/0216516 A1 | 9/2005 | Calistri-Yeh et al. | |
| 2005/0234952 A1 | 10/2005 | Zeng et al. | |
| 2005/0256866 A1* | 11/2005 | Lu et al. | 707/5 |
| 2005/0256867 A1 | 11/2005 | Walther et al. | |
| 2006/0106665 A1 | 5/2006 | Kumar et al. | |
| 2006/0184566 A1 | 8/2006 | Lo et al. | |
| 2006/0206478 A1 | 9/2006 | Glaser et al. | |
| 2006/0212442 A1 | 9/2006 | Conrad et al. | |
| 2006/0212444 A1 | 9/2006 | Handman et al. | |
| 2006/0242139 A1 | 10/2006 | Butterfield et al. | |
| 2007/0005437 A1 | 1/2007 | Stoppelman | |
| 2007/0011203 A1 | 1/2007 | Tsunoda | |
| 2007/0016575 A1 | 1/2007 | Hurst-Hiller et al. | |
| 2007/0032244 A1 | 2/2007 | Counts et al. | |
| 2007/0038615 A1 | 2/2007 | Vadon et al. | |
| 2007/0043583 A1 | 2/2007 | Davulcu et al. | |
| 2007/0043688 A1 | 2/2007 | Kountz et al. | |
| 2007/0067217 A1 | 3/2007 | Schachter et al. | |
| 2007/0078832 A1 | 4/2007 | Ott, IV et al. | |
| 2008/0004989 A1 | 1/2008 | Yi | |
| 2008/0005064 A1 | 1/2008 | Sarukkai | |
| 2008/0040301 A1 | 2/2008 | Sadagopan et al. | |
| 2008/0040313 A1 | 2/2008 | Schachter | |
| 2008/0091549 A1 | 4/2008 | Chang et al. | |
| 2008/0243631 A1 | 10/2008 | Kane et al. | |
| 2008/0243632 A1 | 10/2008 | Kane et al. | |
| 2008/0255934 A1 | 10/2008 | Leventhal et al. | |
| 2009/0006373 A1 | 1/2009 | Chakrabarti et al. | |
| 2009/0006374 A1 | 1/2009 | Kim et al. | |
| 2009/0006398 A1 | 1/2009 | Lam | |
| 2009/0138326 A1 | 5/2009 | Shi | |
| 2010/0191619 A1 | 7/2010 | Dicker et al. | |
| 2010/0306194 A1 | 12/2010 | Evans | |

FOREIGN PATENT DOCUMENTS

| | | |
|---|---|---|
| WO | WO 01/25947 A1 | 4/2001 |
| WO | WO 02/19203 A2 | 3/2002 |
| WO | WO 2008/121737 | 10/2008 |

OTHER PUBLICATIONS

Connotea. "Connotea: Guide" [online], [retrieved on Sep. 22, 2010]. Retrieved from the Internet: <URL:http://web.archive.org/web/20050305025653/www.connotea.org/guide>, 4 pages).*

Riddle. Tags: What are They Good For?. INF 385Q:Knowledge Management School of Information, The university of Texas at Austin [online], May 12, 2005, [retrieved on Sep. 20, 2010]. Retrieved from the Internet <URL: http://www.ischool.utexas.edu/~i385q/archive/riddle_p/riddle-2005-tags.pdf> 13 Pages.*

Muir, David. "Del.icio.us Delightful De-lovely!: Online Social Bookmarking, or: Tagging for Teaching" [online], May 21, 2004, [archived at archive.org on Nov. 7, 2005]. Retrieved from the Internet<URL: http://replay.waybackmachine.org/20051107024448/http://personal.strath.ac.uk/d.d.muir/Delicious_Guide.pdf>, 9 pages.*

Bielenberg, K., and Zacher, M. "Groups in Social Software: Utilizing Tagging to Integrate Individual Contexts for Social Navigation". Master's thesis, Program of Digital Media, University of Bremen [online], Aug. 2005 [retrieved on Dec. 7, 2007]. Retrieved from Internet:< URL:http://users.cs.fiu.edu/~yzhan004/rectangularPacking/tagcloudRoud.pdf>.*

Adam Mathes, "Folksonomies—Cooperative Classification Through Shared Metadata" [online], Dec. 2004, Retrieved from Internet: <URL: http://www.adammathes.com/academic/computer-mediated-communication/folksonomies.html> 18 pates.

Luigi Canali De Rossi, "Grassroots Cooperative Categorization of Digital Content Assets: Folksonomies, What They Are, Why They Work" [online], Jan. 5, 2005. Retrieved from Internet: <URL: http://www.masternewmedia.org/2005/01/05/grassroots_cooperative_categorization_of_digital.htm> 12 pages.

M. Eirinaki, et al., "SEWeP: Using Site Semantics and a Taxonomy to Enhance the Web Personalization Process," SIGKDD'03, ACM 1-58113-737-0/03/0008, Aug. 24-27, 2003, pp. 99-108.

M. Roscheisen et al., "Beyond browsing: shared comments, SOAPs, trails, and on-line communities," Computer Networks and ISDN Systems 27 (1995), pp. 739-749.

J. Rucker, et al., "Siteseer: Personalized Navigation for the Web," Communications of the ACM, Mar. 1997, vol. 40, No. 3, pp. 73-75.

"Just Add People—Collaborative filtering brings human input to information retrieval in the enterprise," Journal ISSN: 8750-6874, Information Week, p. 65, Dec. 22, 1997.

J. Udell, "Collaborative Knowledge Gardening," InfoWorld.com article, dated Aug. 20, 2004, pp. 1-4.

T. Hammond, et al., "Social Bookmarking Tools (I)," D-Lib Magazine, ISSN 1082-9873, Apr. 2005, vol. II, No. 4, pp. 1-23.

Roland Piquepaille, "How do you use del.icio.us?", Published on Nov. 8, 2004, Archived at archive.org on Nov. 10, 2004, Roland Piquepaille's Technology Trends, pp. 1-4.

Abhinandan Das et al. Google News Personalization: Scalable Online Collaborative Filtering, WWW 2007/Track: Industrial Practice and Experience, May 8-12, 2007, (271-280), Banff, Alberta, Canada.

Ellenberg, Jordan. "The Netflix Challenge." Wired, Mar. 16, 2008, p. 114-122.

Blog posting titled "Loomia: a product-recommendation Web service," Alpha Blog, Alpha.cnet.com, dated Jul. 10, 2006 posted by Andrew Gruen, printed form http://reviews.cnet.com/4531-10921_7-6550327.html.

Schonfeld, "The Great Giveaway," article in Business 2.0 Magazine dated Apr. 1, 2005.

Filing Receipt, Specification and Drawings of related pending U.S. Appl. No. 11/281,886, filed Nov. 17, 2005, Title: Recommendations based on item tagging activites of users. Inventors: Aaron Donsbach, et al.

Four web pages printed from www.newsmonster.org site on Aug. 8, 2003; namely web pages at www.newsmonster.org/profile.html (3 printed pages), www.newsmonster.org/reputation.html (1printed page); www.newsmonster.org/intro-Sortby Reputation.html (1printed page), and www.newsmonster.org/feature-breakdown.html (2 printed pages).

Cingil, et al. "A Broader Approach to Personalization," Communications of the ACM, vol. 43, No. 8, dated Aug. 2000, pp. 136-141.

International Search Report and Written Opinion in counterpart PCT application PCT/US 08/58516. Dated. Aug. 11, 2008.

International Search Report and Written Opinion in counterpart PCT application PCT/US 08/67404 Dated Oct. 1, 2008.

Mills, CNET News article titled "Google book scanning still on hold," dated Nov. 4, 2005, printed from www.news.com.

Press release titled "Aggregate Knowledge Delivers Relevance and Increases Revenue for Retail and Media Sites," dated Mar. 7, 2006.

Press release titled "Aggregate Knowledge Unveils the Internet's First Discovery Service," dated Jan. 30, 2007.

Resnick et al "GroupLens: An Open Architecture for Collaborative Filtering of Netnews," Proceedings of ACM 1994 Conference on Computer Supported Cooperative Work, pp. 175-186 (1994).

Riggs et al., "An Algorithm for Automated Rating of Reviewers," International Conference on Digital Libraries, Proceedings of the First ACM/IEEE-CS Joint Conference on Digital Libraries, pp. 381-387 (2001).

Roscheisen et al., "Beyond Browsing: Shared Comments, SOAPS, Trails and On-Line Communities," Proceedings of the Third International World-Wide Web Conference, Computer Networks and ISDN Systems 27, pp. 739-749, dated Apr. 10-14, 1995.

Searls et al., "Building with Blogs," Linux Journal, vol. 2003, Issue 107, p. 4, dated Mar. 2003.

U.S. Appl. No. 10/864,288, filed Jun. 9, 2004 (application text, drawings, and filing receipt provided).

U.S. Appl. No. 11/227,891, filed Mar. 29, 2006 (application, text, drawings, and filing receipt provided).

U.S. Appl. No. 11/758,932, filed Jun. 6, 2007 (application, text, drawings, and filing receipt provided).

\* cited by examiner

FIG.3

Recommended for You > Your Tags > Karsten

Recommendations by Your Activity
Recently Viewed Items

Recommendations by Category
- Books
- DVD
- Music

Recommendations by Your Tags
Books  Britta  gift
travel  bookclub  fiction
research  non-fiction
Andy
▲ See all your tags

Improve Your Recommendations

Jana, your recommendations are based on items you tagged: Karsten.

1. Perro grande... Perro pequeno
by P.D. EASTMAN (Illustrator)
Average Customer Review: ☆☆☆☆☆
Publication Date: March 12, 1982

Price: $34.84
Used & New from $25.91

Add to Shopping Cart
Add to Wish List
Add to Wedding Registry

Rate this item ×☆☆☆☆☆   ☐ I own it   ☐ Not interested

2. ...

3. ...

Home | Recommendations | Products

RECOMMENDATIONS BASED ON ITEM TAGGING ACTIVITIES OF USERS

RELATED CASE

This application is a continuation of U.S. application Ser. No. 11/281,886, filed Nov. 17, 2005, the disclosure of which is hereby incorporated by reference in its entirety.

BACKGROUND OF THE INVENTION

1. Field of the Invention

The invention relates to recommendation services and, more specifically, to methods for providing more focused item recommendations to users.

2. Description of the Related Art

A recommendation service is a computer-implemented service that recommends items stored or represented in a data repository. The recommendations are customized to particular users based on information known about the users. One common application for recommendation services involves recommending products for purchase, rental, subscription, or some other form of consumption. For example, online merchants commonly provide services for recommending books, compact discs, videos, and other types of products to customers based on the purchase histories, rental histories, product viewing histories, and/or product ratings of the respective users. Recommendation services are also common for recommending web sites, articles, users, music files, and other types of items.

One problem with current recommendation services is that they typically generate recommendations based on the target user's aggregate activity or profile data, which typically spans a wide range of user interests. For example, in the context of online sales systems, users typically receive recommendations based on their entire shopping histories, even though users commonly shop for many different people and for many different purposes. Recommendations based on such aggregate user activity frequently are not useful.

Some methods currently exist for allowing a user to receive more focused recommendations. For instance, some systems generate recommendations based on the items currently in the user's shopping cart, or based on the items the user has viewed during the current browsing session. In addition, some systems enable users to request recommendations that are specific to a predefined item category (e.g., music). Further, in some systems, the user can specify that a particular event, such as the purchase or viewing of a particular product, should not be taken into consideration for purposes of generating recommendations. Although these features are helpful, a need remains to enable users to more efficiently and flexibly control the process by which recommendations are generated.

SUMMARY OF THE INVENTION

One embodiment of the invention is a system that provides a user interface through which users can flexibly tag individual items in an electronic catalog with user-defined tags, and obtain recommendations that are specific to particular tags. The tags may, for example, be in the form of textual annotations or labels that are typed in by users, although other forms of content are possible. The tags and tag-item assignments created by each user are stored persistently in association with the user, and may be kept private to the user or exposed to others. By tagging multiple items with the same tag, a user can flexibly define personal item categories or groupings. For example, a user might create the tag "work" for tagging items relevant to the user's profession, or might create the tag "Britta" for tagging potential items to purchase for a friend or family member named Britta.

In accordance with one aspect of the invention, the system also provides users with recommendations that are specific to particular tags. For instance, once a user has assigned the tag "Britta" to a number of items, the user can request and obtain recommendations that are specific to this tag. These recommendations may be generated (typically in real time) by identifying additional items that are collectively similar or related to the set of items associated with this tag, using methods that are known in the art. The system may also provide functionality for obtaining recommendations that are specific to a combination of tags (e.g., "Britta" and "Travel"), and/or for obtaining recommendations based on the tag assignments of other users.

In addition to providing a flexible and efficient mechanism for obtaining focused recommendations, the tags may be used to assist users in tracking, organizing, and locating particular items. For instance, the system may provide various navigational features for enabling users to browse the electronic catalog based on their respective tag-based item categories, and/or the tag-based categories created by others. In addition, the system may provide a search engine that provides functionality for users to conduct keyword-based tag searches to locate particular items.

Methods according to the present invention may be used with any type of item that may be represented or stored in an electronic data repository or catalog, including but not limited to physical products, digital products, services, authors, musical artists, businesses, brands, web sites, web pages, and blogs. In addition, methods according to the present invention may be embodied in a variety of different types of interactive, multi-user systems, including but not limited to web sites, online services networks, interactive television systems, and other types of systems that may be developed in the future.

BRIEF DESCRIPTION OF THE DRAWINGS

These and other features will now be described with reference to the drawings summarized below. These drawings and the associated description are provided to illustrate particular embodiments and implementations of the invention, and not to limit the scope of the invention.

FIG. 3 illustrates a recommendations page listing a set of tag-specific product recommendations.

DETAILED DESCRIPTION OF THE SPECIFIC EMBODIMENTS

Figure 1:
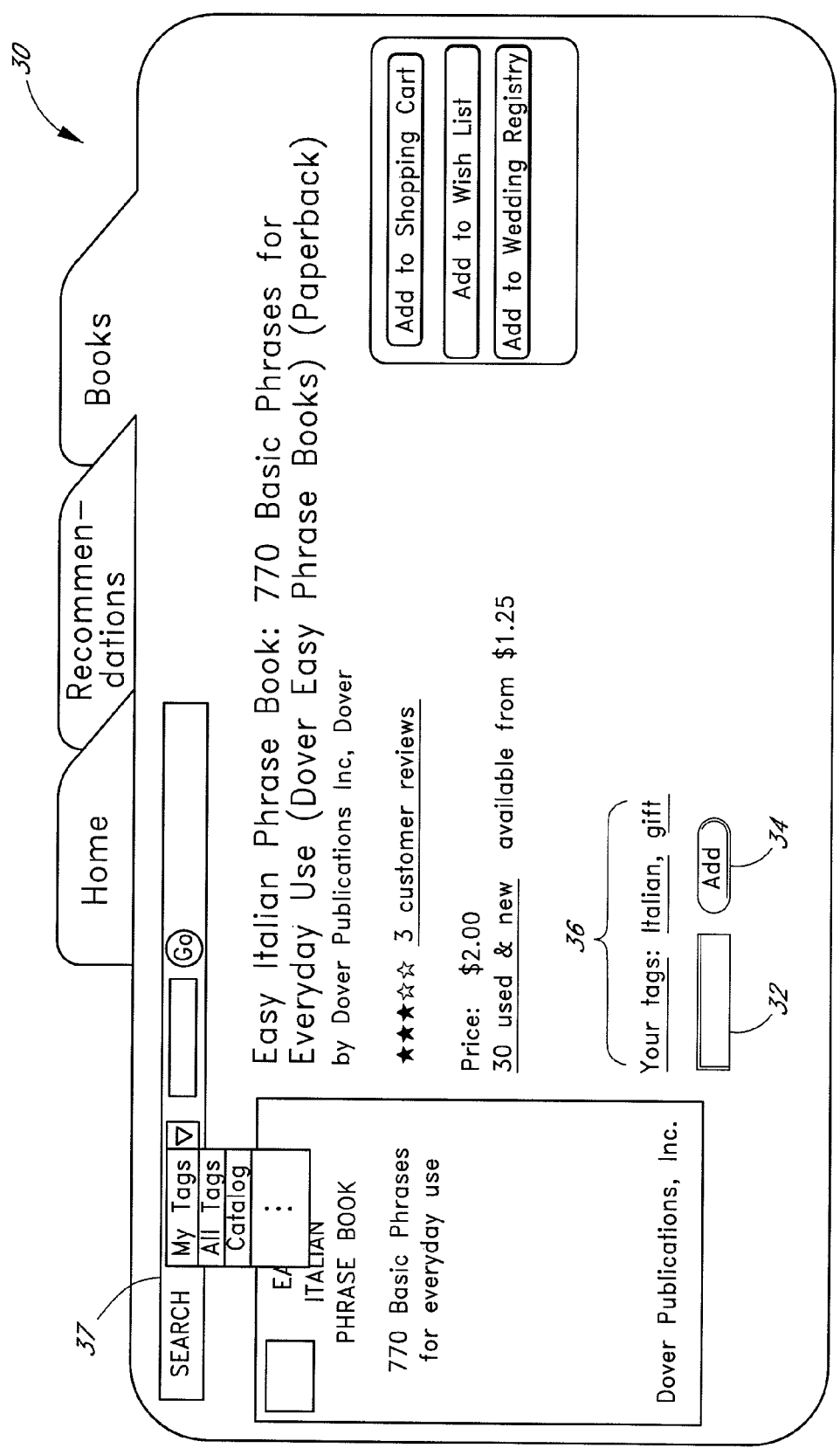
FIG. 1 illustrates a product detail page of an electronic catalog for a particular book title, and illustrates certain web site functionality for assigning user-definable tags to particular products.

The various features and methods will now be described in the context of a system and a set of services used to recommend products from an electronic or other interactive catalog of products to users based on, among other things, tags assigned by users to particular products. The products may, for example, include physical products that are shipped to users, digital products that are downloaded or transmitted to users, tickets for events, and/or services provided to users. As will be recognized, the disclosed methods are also applicable to other types of items, such as authors, musical artists, users, businesses, brands, web sites, web pages, user communities, chat rooms, blogs, etc.

Throughout the description, the term "product" will be used to refer generally to both an actual product (e.g., an Apple iPod) and to its record or description in a computer data repository. A more specific meaning may be implied by context. The more general term "item" will be used in the same manner.

I. OVERVIEW OF EXAMPLE WEB SITE SYSTEM IN WHICH INVENTION MAY BE EMBODIED

To facilitate an understanding of the specific embodiments described below, an overview will initially be provided of an example web site system in which the present invention may be embodied. Throughout the description, reference will be made to various implementation-specific details of this system. These details are provided in order to fully illustrate specific embodiments of the invention, and not to limit the scope of the invention. The scope of the invention is set forth in the appended claims.

In this particular embodiment, the web site system ("web site") comprises functionality for users to search, browse, and make purchases from an electronic catalog of products, such as book titles, music titles, video/DVD titles, and electronics products. The web site may also provide functionality for renting products (such as DVDs), for listing products for sale in an online marketplace, and/or for performing other types of product-related actions. As is conventional, the various products are arranged within a hierarchical browse structure or "browse tree" in which each node represents a product category or subcategory.

Detailed information about each product can be obtained by accessing that product's detail page. (As used herein, a "detail page" is a page that predominantly contains information about a particular product or other item.) In a particular embodiment, each product detail page may comprise a description, picture, and price of the product, customer reviews of the product, lists of related products, and information about the product's availability from one or more sellers.

The product detail pages may also provide functionality for users to perform such actions as purchasing the product, creating a listing for selling the product, or adding the product to a personal shopping cart, wish list, or rental queue.

As discussed below, the product detail pages, and/or other pages of the web site, also include elements for users to assign tags to particular products. These tags may be used for various purposes, including obtaining product recommendations that are specific to user-definable product categories, interests, and contexts. In one embodiment, users can also obtain personalized recommendations without tagging any products; these recommendations may be based on the target user's purchase history, rental history, item viewing history, and/or product ratings.

The recommendations provided by the web site are generated by a recommendation service or "engine" that, in its most basic form, accepts an input list of items (e.g., product IDs), and returns an output list of items that are deemed to be collectively similar or related to the items on the input list. The recommendation service may also optionally take into consideration information about the known or predicted affinity the user has for particular items on the input list. For example, if the user rated one item on the input list highly, and gave an average rating or no rating to another item, the highly rated item may be given more weight. Examples of methods and data structures that may be used to implement the recommendations service are described in U.S. Pat. No. 6,912,505, the disclosure of which is hereby incorporated by reference, and are also summarized below. In addition, specific methods that may be used to generate tag-based recommendations are described below.

II. OVERVIEW OF TAGS

In general, a "tag" may be a descriptive identifier, such as a word or phrase, that is associated with some uniquely identifiable entity within a software application or system. Tags provide a lightweight meta-data collection mechanism that can be leveraged to allow users to classify items in an application with their own vocabulary. Tags are not concerned about being right, but rather about being helpful. Different users will typically describe the same items with different tags. Tags introduce perspective into a categorization framework. A strict taxonomy would force an item to be categorized in only one manner. Tags, however, allow for many categorizations, which allows for multiple perspectives.

In the context of an electronic catalog, a tag may be an identifier that allows the user to group certain items according to different categories. When a user associates an item with a particular tag the user is said to "tag" that item. Typically, a user will tag items in order to create user-defined categories of items, with the tag serving as a category name or label. In some cases, however, users may tag items for purposes other than item categorization (e.g., for enhanced searching, record-keeping, etc.) As such, a tag may encompass more than just a category. In the context of a recommendations service, the primary purpose of using tags to generate recommendations is to harness a user's categorization of certain products.

A particular tag may be meaningful to other users or may be primarily meaningful only to the user who defined it. For instance, a tag such as "creative software" might be meaningful to many users. On the other hand, some tags will likely be meaningful only to the particular user, or the user's immediate family, friends, and associates. For instance, a tag such as "Bill" would likely be meaningful only to those users who know "Bill" and, in particular, to the user who tagged the items "Bill."

In the particular embodiments described herein, a user may assign multiple tags to the same item, and may thus assign the item to multiple tag-based categories. The assignments made by a user of tags to items (or equivalently, items to tags) are referred to herein generally as "tag assignments" or "tag-item associations." The tags and tag assignments created by a given user may be kept private to the user. The web site system may also provide the option for users to selectively expose or "make public" his or her tags and tag assignments. Where tag assignments are made public, tagging allows for emergence—that is, the gradual formation of concepts, categorizations, and/or organizations of information. As different users develop alternative categorizations of particular items, a popular consensus may emerge from the collective efforts of every user that introduces an entirely new or different categorization that synthesizes the perspectives of each user.

In the particular embodiments described herein, the tags are implemented as text character strings. In other embodiments, however, a tag may be any identifier, including text, sound, and image identifiers. For instance, a tag may be an image file, such as a .gif or .jpeg file, or it may be a sound file, such as a voice-recording. Furthermore, in some embodiments, the web site system may provide a set of commonly used tags, such as "family," "gift," "vacation," etc.—or associated images and/or sounds—from which the user may choose to tag a particular item.

III. EXAMPLE USER INTERFACE

FIGS. 1-4 illustrate example catalog pages of the web site, and will be used to describe the process by which users may tag specific products, and use these tag assignments to obtain recommendations. As will be recognized, the particular features of the illustrated web pages are merely illustrative of one of many possible embodiments of the invention.

FIG. 1 illustrates an example product detail page 30 for a particular book product, and illustrates certain web site functionality that permits users to tag products—that is, to associate particular products with certain user-defined categories. The product detail page 30 comprises a description, a picture, and the price of the product, a link to customer reviews of the product, and an overall rating score given by the reviewers. The detail page 30 also includes buttons for adding the product to an electronic shopping cart, wish list, or wedding registry, and includes a link to a page that lists sellers who offer the product for sale.

The product detail page 30 also provides several tagging functions. First, users may add tags to the product displayed in the product detail page 30. A user tags the product by entering a tag name into the tag entry field 32 and by selecting the "Add" button 34. When the user selects the "Add" button 34, the text entered by the user into the tag entry field 32 will become associated with the product, at least for this particular user. This is an instance of a tag assignment—that is, a particular product is associated with, or assigned to, a specified tag. (Alternatively, it might be said that the specified tag is assigned to the particular product.) For instance, if the user enters "Karsten" into the tag entry field 32 and then selects the "Add" button 34, the product will become a member of the group of all items in the electronic catalog that this user has categorized as "Karsten."

The "Your tags" list 36 comprises a list of all of the tags that the user has assigned to the product. Prior to adding the tag "Karsten," the present user of product detail page 30 has already tagged the product as "Italian" and as "gift." After the new tag "Karsten" is added, the text string "Karsten" will appear in the "Your tags" list 36 alongside the previously added tags. If it is the first time that the user has identified a product with the tag "Karsten," then the electronic catalog will create a new tag object, called "Karsten," and associate the product with the new tag—that is, assign the tag to the product. If the user has previously tagged other products with the same tag, then the web site will merely add the product to the set of products already associated with the tag "Karsten."

The web site may also provide each user with a personal tag management page (not shown) that provides functionality for users to view and manage all of their respective tags and tag-item associations. In addition to providing functions for editing, deleting, and organizing these tags, the personal tag management page may enable the user to specify permissions for exposing the tags to other users. For example, in one embodiment, the tag management page lists all of the tags created by the corresponding user, and for each tag, includes a drop-down box for making the tag private, public, or anonymous. If a tag is designated as private, it is not exposed to other users. If a tag is designated as public, other users of the web site can view the tag, view an identifier of the tag's creator, and see how the tag is currently assigned to items in the catalog. An anonymous tag is the same as a public tag, except that the identifier of the tag's creator is not exposed. In one implementation, tags are public by default, but may be changed by the creator to private or anonymous. An option may also be provided for the user/creator to expose a tag on a limited basis to a designated group of users.

Although the ability to specify tag permissions is useful, the present invention may be implemented without the ability for users to specify such permissions. For example, the invention may be embodied in a system in which all tags are kept private, or in a system in which all tags are made public.

Although the example product detail page 30 shown in FIG. 1 only shows how the particular user viewing the page has tagged this product, public and anonymous tags may also be displayed. For example, in one embodiment, if one or more other users have tagged the product using non-private tags, some or all of these tags are displayed on the product's detail page 30. By clicking on the tag of another user, the user can view a listing of all items to which the tag is currently assigned; in addition, if the tag is public, the user can view information about the tag's creator, such as a listing of all of the public tags of the tag's creator.

As illustrated in FIG. 1, a search box may be provided on some or all types of pages of the web site to allow users to search various repositories of items. In the illustrated embodiment, a user can use a drop down box 37 to limit the search to the user's own tags, to all tags, or to the non-tag catalog content. Various other search options may also be provided. If the user conducts a "my tags" search in one embodiment, the web site returns a list of the catalog items that are tagged by this user with a string containing the supplied search term or terms. Thus, for example, if the user conducts a "my tags" search for "anniversary," the system will return a list of all products that are tagged by this user with a tag containing "anniversary." If the user conducts an "all tags" search, the system will additionally include in the search results listing any items that are publicly or anonymously tagged with a string containing the user's search term or terms.

Figure 2:
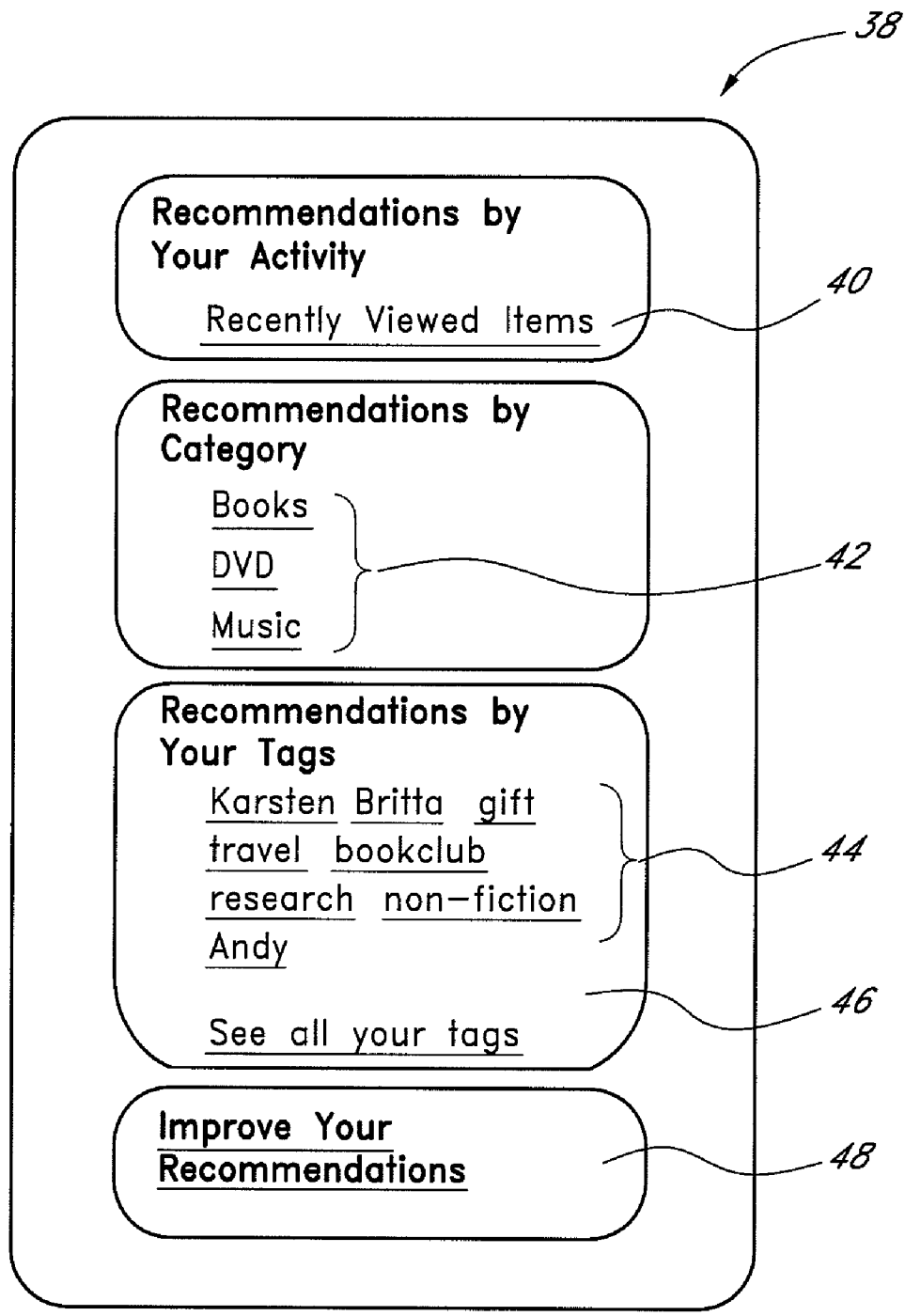
FIG. 2 illustrates a navigation bar that comprises links for obtaining recommendations of products, including recommendations based on general product categories, recommendations based on recently viewed items, and recommendations that are specific to particular tags.

FIG. 2 illustrates an example navigation bar 38 that may be provided on certain types of web pages of the web site, such as "recommendation center" and "personalized store" pages, to enable users to flexibly obtain product recommendations. By selecting the link 40 labeled "Recently Viewed Items," the user can view a list of the products he or she has recently viewed, together with a list of recommended items. This list of recommended items may be generated by passing the list of recently viewed items to the web site's recommendations service to obtain a set of similar items.

The navigation bar 38 also includes a set of links 42 for obtaining personalized recommendations that are specific to a particular product category of the web site's browse tree. Each such link 42 points to a recommendations page for the respective category, such as "Books." These category-specific recommendations may, for example, be based on the target user's purchase history, item rating history, item viewing history, item rental history, and/or a combination thereof.

Of particular importance to this embodiment of the invention, recommendations may also be obtained based on products that the user has tagged as belonging to a specific category. For instance, in this example, the user can click on the link/tag labeled "Karsten" to access a web page (see FIG. 3) which displays product recommendations that are specific to this tag. In the illustrated embodiment, these recommendations are based exclusively on the set of products the user has associated with this tag. For example, if the user has tagged five different products with the label "Karsten," a list of these five items would be passed to the recommendations service for purposes of obtaining the recommendations list. If the user has rated any of these five items, the assigned rating or ratings may also be passed to the recommendations service and taken into consideration. In the illustrated example, the navigation bar also includes links for viewing tag-specific recommendations for the tags "Britta," "gift," "travel," "bookclub," "research," "non-fiction," and "Andy."

One advantage of this feature is that users have increased means to focus recommendations to their particular interests. Users of an electronic catalog may purchase, select for purchase, rate, rent, and/or view items for many different purposes. For instance, a user may view and purchase items for purposes of purchasing a gift for a friend, but may only want recommendations based on these items the next time the user shops for a gift for this friend. The ability to obtain tag-specific recommendations provides an efficient mechanism for the user to accomplish this objective.

The system may also provide functionality (not shown) for the user to request recommendations that are specific to a set of two or more tags. For instance, a set of check boxes may be provided to specify the tags to be used to generate the recommendations. Thus, for example, if the user selects "Britta" and "travel," the recommendations service would group together these two user-defined categories as its input list, and would give greater weight to any items that are assigned to both of these categories.

The system may also provide recommendations that are based on various combinations of the above criteria. For example, a set of recommendations may be based on both user-defined tags and on user-viewing histories (e.g., all products the user has recently viewed that correspond to a particular user-defined tag). Additionally, a user may request tag-specific recommendations that are limited to a particular top-level browse tree category such as "music" or "books."

The navigation bar 38 also includes a link 46 labeled "See all your tags," which leads to a page for viewing and managing all of the tags created in the user's account. In addition, the user can select the "Improve Your Recommendations" link 48 to access a page for improving the quality of the various types of recommendations; an example of such a web page is shown in FIG. 4 and is discussed below.

FIG. 3 illustrates an example recommendations page 50 which displays tag-specific recommendations for the tag "Karsten." Similar to the product detail page 30 described above with reference to FIG. 1, the recommendations page 50 comprises various details about the listed products (one product shown), and includes buttons for adding each product to an electronic shopping cart, wish list, and/or wedding registry. In this example, the recommendation page 50 also includes a set of controls for rating, indicating ownership of, and indicating a lack of interest in, each listed product. The recommendations service may use this information to improve the recommendations it makes. The recommendations page 50 may also comprise tagging functionality (not shown), as described above with reference to FIG. 1, to enable the user to immediately tag recommended items.

Figure 4:
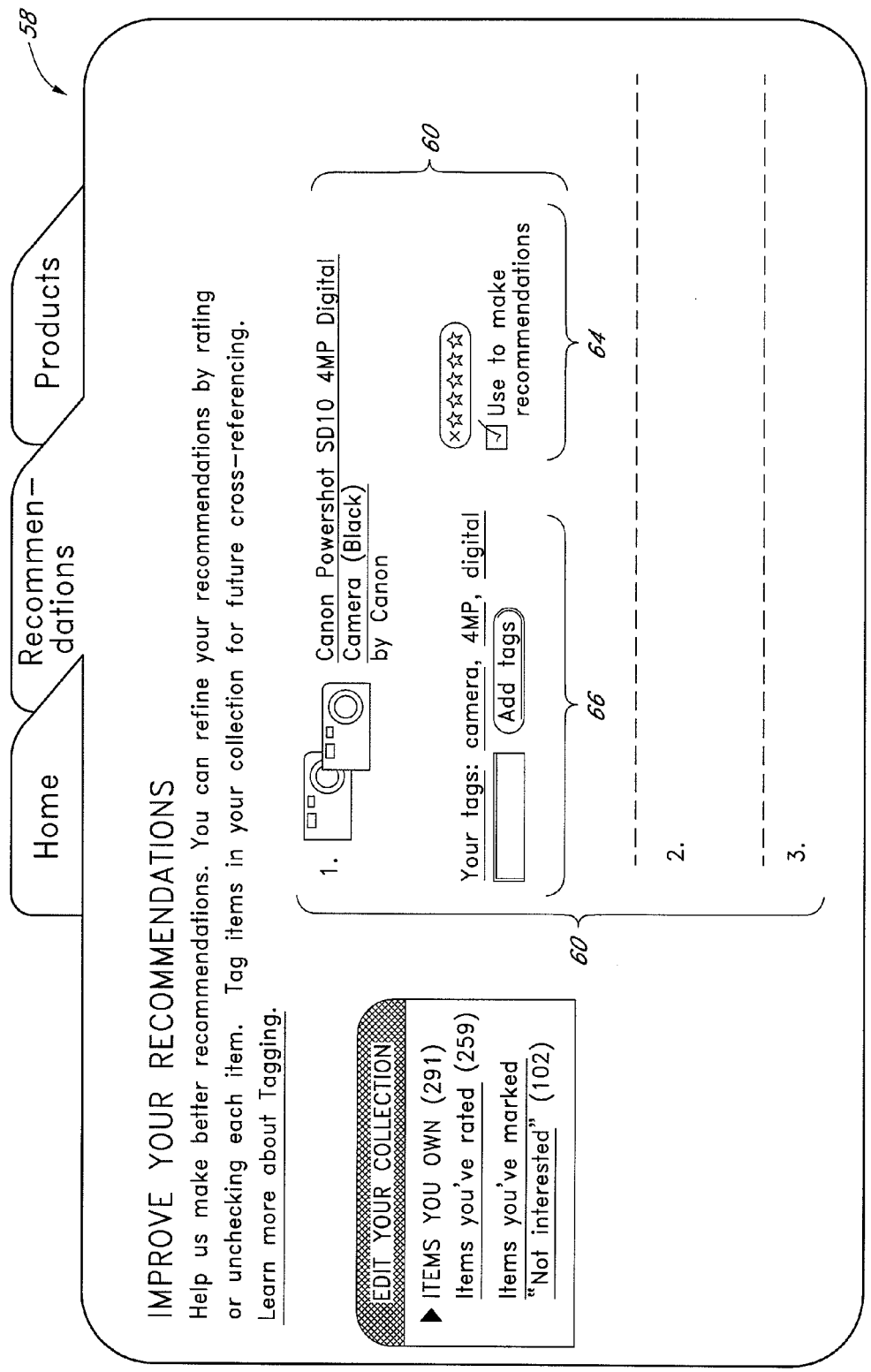
FIG. 4 illustrates an "Improve Your Recommendations" page that comprises a list of products that a user has purchased from the electronic catalog, and which provides functionality to tag and rate each item, and to specify which items are to be used to generate recommendations.

FIG. 4 illustrates an example "Improve Your Recommendations" page 58 of the electronic catalog. Using the links displayed at the left of this page, the user can select for viewing a list of the items the user owns, has rated, or has marked as "not interested." For each of these lists, the "Improve Your Recommendations" page 58 provides, for each product 62, ratings functionality 64 and tagging functionality 66. Thus, using the ratings functionality 64, users may rate each product so that the recommendations service will take the user's level of affinity for the particular products into consideration. Although item ratings are helpful to providing high-quality recommendations, the present invention may be implemented without providing users the ability to rate individual items.

The ratings functionality 64 also allows the user to indicate whether each product should be taken into consideration for generating subsequent recommendations. In one embodiment, unless the user un-checks the "use to make recommendations" box for a tagged item, the item will be considered when generating corresponding recommendations. If the user un-checks this box, the tagged item is not used to generate general (non-tag-specific) recommendations, but, in some embodiments, is still used to generate tag-specific recommendations for the corresponding tag.

The "Improve Your Recommendations" page also provides tagging functionality 66 for each listed item, so that users can immediately tag these items without having to navigate to the corresponding product detail pages. This tagging functionality 66 is the same as described above with reference to FIG. 1. Similar tagging functionality 66 may be provided on various other types of pages, including browse node pages of the browse tree, search results pages, and shopping cart pages.

IV. COMPONENTS OF WEB SITE SYSTEM

Figure 5:
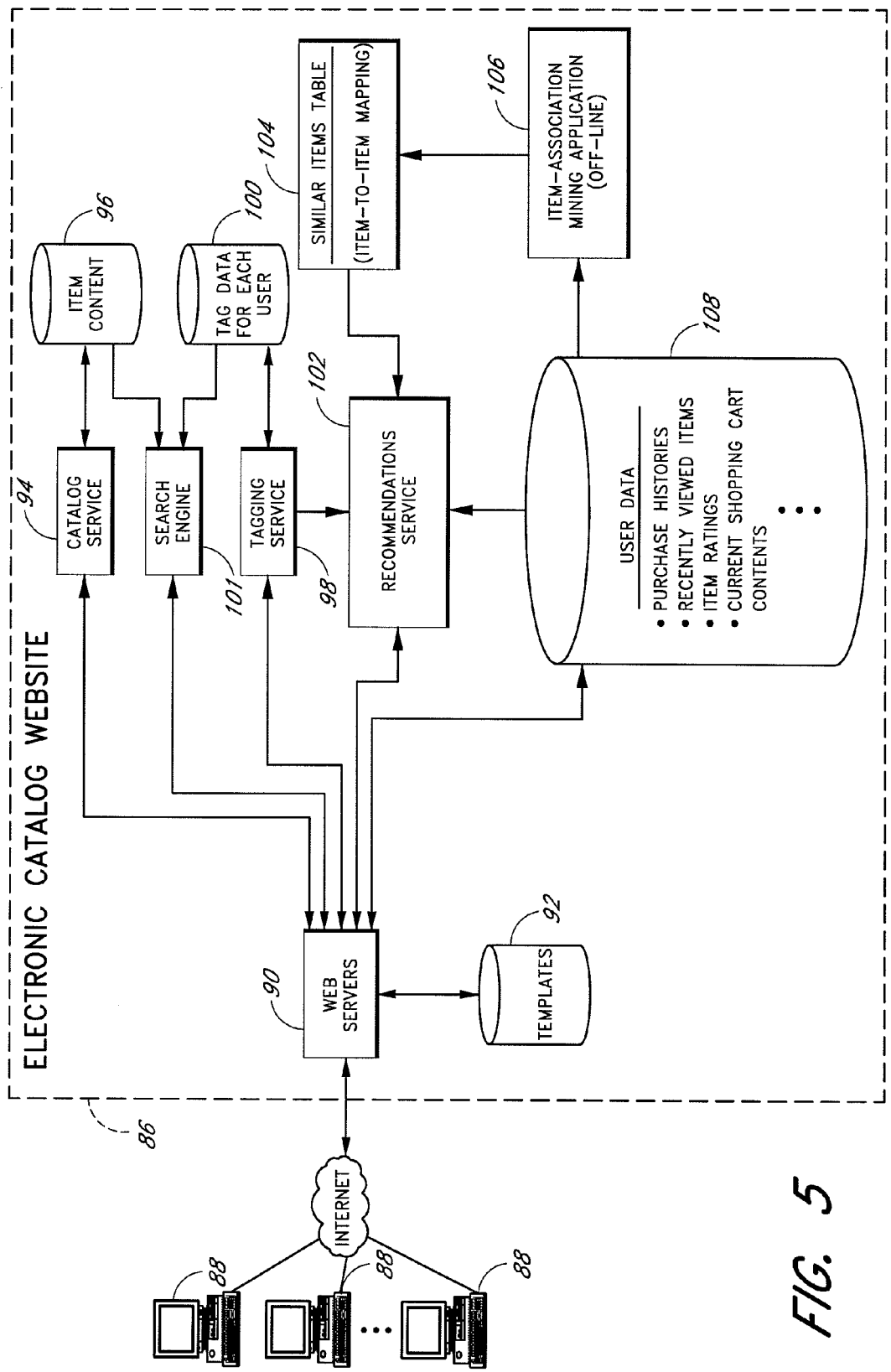
FIG. 5 illustrates a web site system that implements tagging and recommendation services in accordance with the invention, and illustrates the flow of information between components of the system.

FIG. 5 illustrates a set of components that may be included in the web site system 86 to implement the item recommendation and tagging functions mentioned above. The arrows in FIG. 5 show the general flow of information between components. As illustrated by FIG. 5, the system may be accessed by user computers 88 over the Internet. Although shown as personal computers for purposes of illustration, the user computers 88 may include various other types of computing devices, including Personal Digital Assistants (PDAs), wireless phones, set-top television boxes, etc. In the embodiment shown in FIG. 5, the system 86 comprises web servers 90 which process HTTP (Hypertext Transfer Protocol) requests received over the Internet from the user computers 88 that run web browser software. In response to user requests, the web servers 90 dynamically generate content-dependent web pages according to user-specific information. The web servers 90 access a repository of web page templates 92 that specify the layout and format of product detail pages, recommendations pages, and various other types of web pages. The web servers 90 populate these templates with information that is typically dependent upon the identity of the particular user, as may be determined using browser cookies.

As illustrated in FIG. 1, the web servers 90 retrieve catalog content for particular products from a Catalog Service 94, which includes or accesses a repository 96 of item content. The item content may, for example, include photos, reviews, price and availability data, and other types of descriptive information about particular products that are available to purchase, rent, download, review, post for sale, etc. via the web site.

The web servers 90 also communicate with a Tagging Service 98 that maintains a database 100 of user-specific tag data. The tag data stored for each user may, for example, include a set of tag-item ID pairs, optionally together with various other types of data such as permission data and a creation timestamp. The Tagging Service 98 may receive both read requests from the web servers (e.g., when a user requests a page that displays personal tag data), and update requests (e.g., when a user tags an item). In one embodiment, each tag is stored in association with the corresponding user, meaning that if two or more users create identical tags, these tags are treated as separate and distinct from each other.

The web servers 90 also communicate with a search engine 101 that allows users to search for information stored in the item content and tag data repositories 96 and 100. As mentioned above, the search engine may include functionality (including a keyword index) for users to search for items using their own respective tag associations, and/or the tag associations of others. A user interface for this function of the search engine 101 is described above with reference to FIG. 1.

The web servers 90 also access a recommendations service 102 which generates item recommendations as described above. To request recommendations for a particular user, the web servers 90 send a list of one or more items (e.g., product IDs) to the recommendations service 102 (optionally together with associated item ratings), which responds with a list of recommended items. In the illustrated embodiment, the recommendations service 102 accesses a Similar Items Table 104 which contains item-to-item mappings used to generate the recommendations. The item-to-item mappings represented in this table 104 may reflect purchase-based similarities (e.g., items A and B are similar because a relatively large portion of the users who purchased item A also bought item B), item viewing based similarities (e.g., items A and B are related because a significant portion of those who viewed item A also viewed item B), tag-based similarities (e.g., items A and B are similar because a relatively large portion of the users who tagged item A assigned the same tag to item B), content-based similarities, and/or similarities based on other criteria.

The Similar Items Table 104 is generated or updated offline by the Item-Association Mining Application 106, which may use the same or similar data analysis methods to those described in U.S. Pat. No. 6,912,505, referenced above. In one embodiment, each similar items list generated by the Item-Association Mining Application 106 and stored in the Similar Items Table 104 consists of the N (e.g., 20) items which, based on correlations between items, are deemed to be the most closely related to the item for which associations are sought. Each item in the Similar Items Table 104 is stored together with a commonality index ("CI") value which indicates the relatedness of that item to the item for which associations are sought.

As will be recognized, the invention is not limited to the particular type of recommendation service described herein. For example, the invention may be practiced using any recommendation engine or service capable of generating a set of recommended items given an input set of items.

The web servers 90 also access one or more additional repositories of user data, logically represented in FIG. 5 by the repository 108. Because a group of individuals can share an account, a given "user" may include multiple individuals (e.g., two family members that share a computer). As illustrated by FIG. 5, the data stored for each user may include one or more of the following types of information (among other things) that can be used to generate recommendations in accordance with the invention: (a) the user's purchase history, including dates of purchase, (b) a history of items recently viewed by the user, (c) the user's item ratings profile, if any, and (d) the current contents of the user's personal shopping cart. Various other types of user information, such as wish list/registry contents, email addresses, shipping addresses, and clickstream histories, may additionally be stored.

The various components of the web site system 86 may run, for example, on one or more servers (not shown). In one embodiment, the Similar Items Table 104 is be stored as a B-tree data structure to permit efficient look-up, and may be replicated across multiple machines to accommodate heavy loads. As will be appreciated, the present invention may also be implemented using a recommendations algorithm that does not make use of a similar items table or other item-to-item similarity mappings.

VI. PROCESS FOR GENERATING TAG-SPECIFIC RECOMMENDATIONS

The general sequence of steps that are performed by the recommendations service 102 to generate a set of personal recommendations based on a users' tagging activity will now be described with reference to FIG. 6. This process 68 is intended to illustrate, and not limit, the scope of the invention.

The process 68 may be invoked in real-time in response to an online action of the user. For example, the user may specifically request recommendations based on one of the user's tags. Alternatively, the process 68 may be invoked in response to an online action of the user that does not directly request the recommendations. For instance, the process 68 may be invoked in response to the user adding a tag to an item, such that the user is provided with recommendations based on the updated set of items associated with this tag.

Any of a variety of other methods can be used to initiate the recommendations generation process and to display or otherwise convey the recommendations to the user. For example, the recommendations can automatically be generated periodically and sent to the user by e-mail, in which case the e-mail listing may contain hyperlinks to the product information pages of the recommended items. Further, the personal recommendations could be generated in advance of any request or action by the user, and cached until requested.

Figure 6:
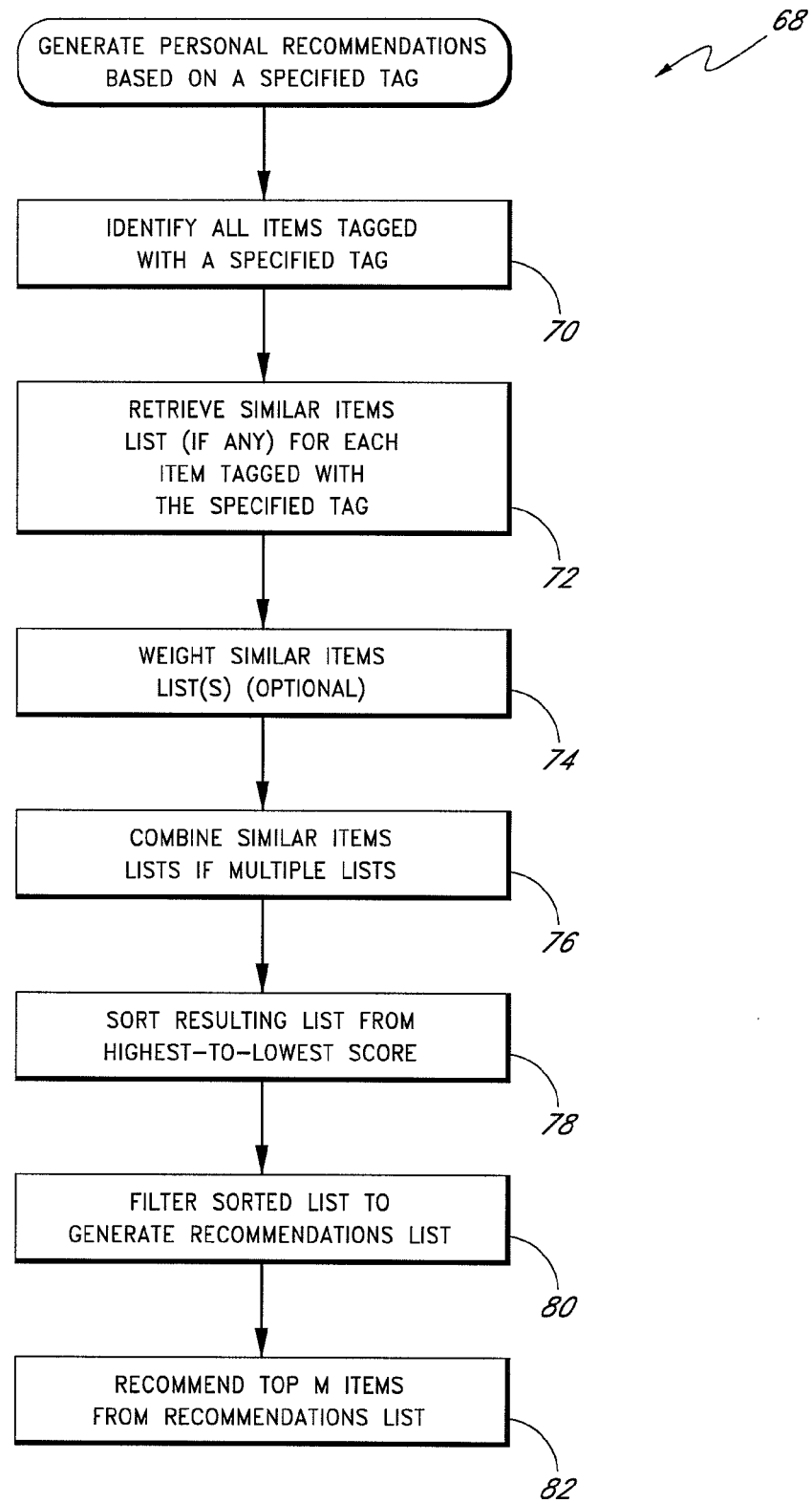
FIG. 6 illustrates a sequence of steps that are performed by the recommendation service of FIG. 5 to generate personalized, tag-specific recommendations.

As illustrated by FIG. 6, the first step 70 of the recommendations-generation process involves identifying the set of items tagged with a specified, user-defined tag. In one implementation, items tagged with the specified tag may be removed from the input list if the user indicated that the particular item should not be used to make recommendations (see checkbox shown in FIG. 4). Alternatively, as mentioned above, these items may be retained on the input list under the assumption that the user only wants to exclude these items for purposes of generating non-tag-specific recommendations.

In step 72, for each item tagged with the specified tag, the recommendation service retrieves the corresponding similar items list from the Similar Items Table 104, if such a list exists. If no entries exist in the table for any of the items tagged with the specified tag, the process may be terminated; alternatively, the process could attempt to identify additional items of interest, such as by accessing other sources of interest information.

In step 74, the similar items lists are optionally weighted based on information about the user's affinity for the corresponding tagged items. For example, a similar items list may be weighted heavily if the user gave the corresponding tagged item a rating of "5" on a scale of 1-5, or if the user purchased multiple copies of the tagged item. Weighting a similar items list heavily has the effect of increasing the likelihood that the items in that list will be included in the recommendations ultimately presented to the user. The similar items lists may additionally or alternatively be weighted based on other factors; for instance, for tagged items that have not been rated by the user, the similar items list for a recently tagged item may be weighted more heavily than a similar items list for a less recently tagged item.

The similar items lists may be weighted by multiplying the commonality index values of the list by a weighting value. The commonality index values as weighted by any applicable weighting value are referred to herein as "scores." In some embodiments, the recommendations may be generated without weighting the similar items lists.

If multiple similar items lists are retrieved in step 74, the lists are appropriately combined (step 76), optionally by merging the lists while summing or otherwise combining the scores of like items. The resulting list is then sorted (step 78) in order of highest-to-lowest score. By combining scores of like items, the process takes into consideration whether an item is similar to more than one of the tagged items on the input list. For example, an item that is related to two or more of the tagged items will generally be ranked more highly than (and thus recommended over) an item that is related to only one of the tagged items. In another embodiment, the similar items lists are combined by taking their intersection, so that only those items that are similar to all of the tagged items are retained for potential recommendation to the user.

In step 80, the sorted list may be filtered to remove unwanted items. The items removed during the filtering process may include, for example, items that have already been purchased or rated by the user, items for which the user has checked the "I own it" box (see FIG. 3) and/or items included on the input list. In addition, in embodiments which allow the user to specify a recommendations filter, the items falling outside any product category (such as music, books, or non-fiction) or content rating (such as PG or adult) designated by the user may be removed. The filtering step could alternatively be performed at a different stage of the process, such as during the retrieval of the similar items lists from the table (step 72). The result of step 80 is a list ("recommendations list") of items to be recommended to the user.

Finally, in step 82, a list of the top M (e.g., 15) items of the recommendations list is returned to the web servers 90 (FIG. 5) for incorporation into the recommendation page (see example recommendation page of FIG. 3). As mentioned above, the recommendations may alternatively be conveyed to the user by e-mail, facsimile, or other transmission method. Further, the recommendations could be presented as advertisements for the recommended items.

VII. RECOMMENDATIONS BASED ON TAGS OF OTHER USERS

The system 86 may also provide functionality for users to obtain recommendations that are based on the tag-item associations created by other users. For example, the system may provide a user interface through which a first user can view a tag created by a second user, together with a list of the items the second user has associated with the tag. This interface may also provide include a link that is selectable by the first user to request recommendation that are specific to the tag. These recommendations may be generated using the same methods as described above. The system 86 may also provide an option for a first user to obtain item recommendations that are specific to all, or to a designated subset, of the tags created by a second user.

VIII. TAG-BASED ITEM ASSOCIATIONS

The tag data maintained by the system 86 may also optionally be used to detect item associations or "similarities." For example, products A and B may be treated as related if a significant portion of the users who assign a tag to product A assign the same tag to product B, disregarding different tag strings used by different users. Thus, for example, the item-associations mining application 106 shown in FIG. 5 may analyze the tag data of a population of users—in addition or as an alternative to analyzing purchase histories and/or item viewing histories—for purposes of generating the Similar Items Table 104. The purchase-history-based and item-viewing-history based algorithms described in U.S. Pat. No. 6,912,505, mentioned above, may be used for this purpose, but with each group of items associated with a particular tag treated as a purchase history or an item viewing history, respectively.

IX. MINING OF ASSOCIATIONS BETWEEN TAG STRINGS

The tag data collected for a population of users may also be analyzed for purposes of detecting text strings that are closely related. Specifically, the tag data may be analyzed on an aggregated basis to identify text strings that are used relatively frequently to tag the same item. For instance, string A and string B may be treated as closely related if a relatively large percentage of the items tagged with string A are also tagged with string B (or vice versa). Thus, for example, if items that are tagged with the word "camping" are also frequently tagged with the word "outdoors," the terms "camping" and "outdoors" may automatically be treated as related.

The string associations detected from the aggregated tag data may be used for various purposes. As one example, when a user creates or requests the creation of a new tag, the system 86 may suggest to the user other strings that are related to the user-supplied string. As another example, when a user conducts a catalog search, the text strings most closely related to the user's search string may be suggested to the user as alternative search strings, or as additional terms to add to the submitted search string to narrow the search.

Further, tags may be subjected to other kinds of analysis, such as linguistic or semantic analysis for textual tags, photographic analysis for photo-based image tags, etc., in an effort to detect similar or related tags and to provide normalized forms of such tags. For example, items that are variously tagged as "bike," "bicycle," "bicycles," "cycling," and "bicycling" may be grouped together as being related, and a single tag identifier (possibly one of those listed above, such as "cycling") may be proposed by the system 86 to users for future tagging of similar items.

X. APPLICATIONS INVOLVING OTHER TYPES OF ITEMS

As will be apparent from the foregoing, the methods and features described above can also be applied to various other types of items that may be represented or stored in an electronic catalog or data repository. For example, in the context of the web site system 86 described above, the user interface may additionally support the ability for users to tag any one or more of the following types of items: authors, artists, user-posted lists of items, reviewers, brands, manufacturers, users, user communities, and marketplace sellers. Further, in the context of a system of the type described in U.S. Pat. Pub. 2005/0038717 A1 (the disclosure of which is hereby incorporated by reference), users may be given the option to tag particular blurbs and/or blurb authors that appear in the users' respective personal web logs or "plogs," and then use such tags to obtain recommendations of additional blurbs and/or blurb authors.

The tag assignments made by a user (or other users) to such items may be used to generate tag-specific item recommendations using the same methods as described above. In addition, these tag assignments may be used to detect associations between items of each of these types (e.g., author-author associations, user-to-user associations, brand-brand associations, etc.) using the methods described in section VIII.

XI. CONCLUSION

The various methods described above may be embodied in, and fully automated by, software code modules executed by one or more general purpose computers. The code modules may be stored in any type of computer storage device or devices (hard disk storage, solid state RAM, etc.). The data repositories 96, 100, 108 shown in FIG. 5 may be implemented using any type of computer storage device or devices, and using any type or types of data repositories (relational databases, flat files, caches, etc.).

As will be appreciated, various combinations of the features and methods described herein may be incorporated into a given system according to the invention. Accordingly, all combinations of the disclosed features and methods fall within the scope of this disclosure.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A system for enabling a user to obtain focused item recommendations for a user-specified category of items, the system comprising:
   one or more computer systems comprising computer hardware, the one or more computer systems programmed to implement:
   a tagging system that provides functionality for a user to:
      create tags via entry of text strings into tag fields of item detail pages, the item detail pages each comprising information descriptive of a catalog item in an interactive catalog of items, and
      associate the tags with selected catalog items of the interactive catalog such that each of the tags classifies one or more of the catalog items, wherein the tagging system is configured to store user-specific tag data in a data repository, the user-specific tag data reflecting an association created by the user between the tags and the selected catalog items,
   wherein the tagging system outputs for display to the user one or more of the tags created by the user; and
   a recommendation system configured to generate tag-specific recommendations by at least:
      receiving a user selection of a displayed tag of the one or more tags output for display to the user;
      programmatically accessing the user-specific tag data in response to receiving the user selection of the displayed tag, to thereby identify at least one of the selected catalog items previously tagged with the displayed tag by the user,
      without requiring further user interaction, programmatically accessing item relationship data to identify a set of additional items that are related to the at least one of the selected catalog items previously tagged by the user, and
      selecting the tag-specific recommendations from the set of additional items for output to the user.

2. The system of claim 1, wherein the item relationship data comprises item-to-item similarity mappings.

3. The system of claim 2, wherein the item-to-item similarity mappings are based, at least in part, on tag-based item similarities detected by analyzing aggregated tag data of a population of users.

4. The system of claim 1, wherein the tagging system and the recommendation system are implemented by one or more machines.

5. The system of claim 1, wherein said user selection of one of the tags previously created by the user comprises a user selection of a link comprising text corresponding to the tag previously created by the user.

6. The system of claim 1, wherein the recommendation system is further configured to identify a plurality of catalog items previously tagged with the displayed tag by the user and generate recommendations based on the plurality of catalog items.

7. A method of enabling a user to obtain focused item recommendations for a user-specified category of items, the method comprising:
   by one or more computer systems comprising computer hardware:
      providing a tagging interface that provides functionality for a user to create tags for classifying items represented in an interactive catalog via entry of text strings into tag fields of item detail pages of the catalog, the item detail pages each comprising information descriptive of a catalog item in an interactive catalog of items;
      persistently storing tag data of the user in a data repository, the tag data specifying tags and tag-item associations created by the user via the tagging interface;
      outputting for display to the user one or more of the tags created by the user; and
      generating tag-specific item recommendations, said generating comprising:
         receiving a user selection of a displayed tag of the one or more tags output for display to the user;
         programmatically accessing the tag data in response to receiving the user selection of the displayed tag, to thereby identify at least one of the catalog items previously tagged with the displayed tag by the user,
         without requiring further user interaction, programmatically accessing item relationship data to identify a set of additional items that are related to the catalog items previously tagged by the user with the displayed tag, and
         selecting at least a portion of the additional items to recommend to the user as the tag-specific item recommendations.

8. The method of claim 7, wherein identifying the set of additional items comprises identifying the additional items from item relationship data, the item relationship data comprising item-to-item similarity mappings.

9. The method of claim 8, further comprising generating the item-to-item similarity mappings, at least in part, by analyzing aggregated tag-item association data of a plurality of users to detect tag-based item similarities.

10. The method of claim 7, wherein the method is configured to be performed by an interactive system comprising one or more machines.

11. The method of claim 7, wherein the tagging interface further enables the user to limit the tag-specific item recommendations to selected items within a category of the interactive catalog.

12. A system, comprising:
- a server system that provides user access to an interactive catalog of items, said interactive catalog including item detail pages that correspond to particular catalog items, the item detail pages providing functionality for users to tag individual catalog items via entry of textual strings into tag fields provided on the item detail pages, the item detail pages thereby enabling each user to create one or more tags, and to associate each tag with one or more catalog items;
- a data repository that persistently stores user-specific tag data specifying the tags and tag-item associations created by the users via the item detail pages; and
- a recommendation system, said recommendation system comprising a recommendation interface accessible to users via the server system, said recommendation interface providing functionality for a user to view a list of the tags created by the user, and to generate a tag-specific request for recommendations corresponding to a tag selected from said list by the user, the recommendation system capable of responding to the tag-specific request for recommendations by at least:
  - (a) programmatically using the user-specific tag data to identify a plurality of catalog items that have been tagged by the user with the selected tag,
  - (b) without requiring further user interaction, programmatically accessing item relationship data to identify a set of additional related items that are related to the catalog items tagged by the user; and
  - (c) selecting tag-specific recommendations from the set of additional items for output to the user;
- wherein the server system and the recommendation system are implemented by one or more computing devices comprising computer hardware.

13. The system of claim 12, wherein the item detail pages are configured to display a list of the tags created by the user and to provide functionality for the user to select from the list of tags.

14. The system of claim 12, wherein the set of additional related items are related to the catalog items based at least partly on item-to-item similarity mappings.

15. The system of claim 14, wherein the item-to-item similarity mappings are based, at least in part, on tag-based item similarities detected by analyzing aggregated tag data of a population of users.

16. The system of claim 12, wherein the server system and the recommendation system are implemented by one or more machines.

17. The system of claim 12, wherein the recommendation system is further configured to receive a category selection from the user and to limit the tag-specific item recommendations to selected items within the category.

* * * * *